US008042657B2

(12) United States Patent
Zhang et al.

(10) Patent No.: US 8,042,657 B2
(45) Date of Patent: Oct. 25, 2011

(54) ONE-WAY LOAD SELF-CONTROL SPIRAL TYPE BRAKE

(75) Inventors: Guogang Zhang, Zhenjiang (CN); Mingqiang Wang, Zhenjiang (CN); Guoqiang Ding, Zhenjiang (CN)

(73) Assignee: Zhejiang Nowvow Mechanical and Electrical Co., Ltd., Zhejiang (CN)

( * ) Notice: Subject to any disclaimer, the term of this patent is extended or adjusted under 35 U.S.C. 154(b) by 0 days.

(21) Appl. No.: 12/765,387

(22) Filed: Apr. 22, 2010

(65) Prior Publication Data

US 2011/0155837 A1 Jun. 30, 2011

(30) Foreign Application Priority Data

Dec. 30, 2009 (CN) .......................... 2009 1 0157062

(51) Int. Cl.
*B60T 7/12* (2006.01)

(52) U.S. Cl. .................... 188/82.1; 188/134; 188/196 D

(58) Field of Classification Search ........ 188/82.1–82.5, 188/134, 290, 196 D; 192/223.3, 223.4; 74/89.16; 254/344, 375
See application file for complete search history.

(56) References Cited

U.S. PATENT DOCUMENTS

| | | | | | |
|---|---|---|---|---|---|
| 4,176,733 | A | * | 12/1979 | Twickler | 188/134 |
| 4,483,429 | A | * | 11/1984 | Tiedeman | 192/223.3 |
| 4,625,843 | A | * | 12/1986 | Maltby et al. | 192/223.3 |
| 4,898,265 | A | * | 2/1990 | Metcalf | 192/223.3 |
| 5,482,255 | A | * | 1/1996 | Daschel et al. | 254/378 |
| 7,222,700 | B2 | * | 5/2007 | Elliott | 188/30 |

* cited by examiner

*Primary Examiner* — Christopher Schwartz
(74) *Attorney, Agent, or Firm* — Birch, Stewart, Kolasch & Birch, LLP

(57) ABSTRACT

A one-way load self-control spiral type brake, including a reel, two bearing frames on the reel, a brake shaft set between the two bearing frames, and two ends of the brake shaft connecting a transmission shaft. A front end of said brake shaft equipped with a fixing apparatus. Behind the fixing apparatus, a first inner friction piece, a first external friction piece, a second inner friction piece, a second external friction piece, an internal screw thread pressure plate, a tension spring, a connection piece and a brake shaft coupling are provided in sequential order around the brake shaft, and are fixed together by a socket and spigot joint. The inner friction piece and the brake shaft mesh. An external tooth is set on an outer circle of the external friction piece. A front end of the brake shaft coupling is fixed outside of an internal screw thread pressure plate.

10 Claims, 3 Drawing Sheets

ONE-WAY LOAD SELF-CONTROL SPIRAL TYPE BRAKE

CROSS-REFERENCE TO RELATED APPLICATION

The present application claims priority under 35 U.S.C. §119 to Chinese Patent Application No. 2009-10157062.2, filed Dec. 30, 2009, the entire contents of which are hereby incorporated by reference.

BACKGROUND OF THE INVENTION

1. Field of the Invention

This invention relates to braking equipment, especially as related to a one-way load self-control spiral type brake that is used for capstan winch braking.

2. Description of Background Art

More and more people from the city like to go to the field by driving a vehicle. However, if they run into poor natural conditions, it may be difficult to get away because of the unfavorable condition. Conventionally, a capstan winch is needed to help the vehicle extricate itself from a predicament. When the capstan winch is in operation, it needs a brake to guarantee that the heavy object being drawn does not glide down when the motor of the winch stops or is damaged. There are many examples of conventional brakes used in capstan winches, such as an awl drum type, a piston ring type, and a ratchet type. However, each type has its own disadvantages. The service life of the piston ring type is very short. The ordinary ratchet type capstan winch is apt to lose its rope (cable) easily, and release the object. The awl drum type is better than the other two kinds of brakes, from the view of the work performance of the capstan winch itself. However, it may not have a long-term service life, and the reliability of braking may not be satisfactory. At the same time, the above three kinds of brakes also have several common shortcomings. That is, during the operation, each produces a large quantity of heat, and heat dissipation is difficult, and may the damage of the capstan winch.

Therefore, in order to guarantee the safety of driving in the field, it is necessary to propose an invention which can not only overcome the weak points of above-mentioned brakes, but also can satisfy the work performance of the capstan winch brake. Also, it needs a simple structure and it is easy to be fixed and applied.

SUMMARY AND OBJECTS OF THE INVENTION

The purpose of the present invention provides a one-way load self-control spiral type brake. It should have a fast brake reaction, a good brake effect, good heat dissipation, reliability of braking, and a long service life. At the same time, it should have a simple structure, be convenient for installation, and popular among the ordinary consumers.

According to an embodiment of the invention, the one-way load self-control spiral type brake includes a reel. Two bearing frames are equipped in the reel. The brake shaft is set between the two bearing frames. The two ends of the brake shaft connect the transmission shaft. The front end of said brake shaft is equipped with a fixing apparatus, and from the fixing apparatus, there is in turn the following units fixed around the brake shaft. An inner friction piece and an external friction piece are alternately fixed by means of a socket and spigot joint, and in turn an internal screw thread pressure plate, a torsional spring, a connection piece and a brake shaft coupling are fixed by means of the socket and spigot joint. The inner friction piece and the brake shaft mesh with each other, and an external tooth is set on the outer circle of the external friction piece. The front end of the brake shaft coupling is fixed on the outside of the internal screw thread pressure plate, the torsional spring and the connection piece by means of the socket and spigot joint. In the reel, there is an inner tooth which meshes the external tooth on an outer circle of said external friction piece.

Advantageously, the fixing apparatus and said brake shaft are formed by an integrative molding step. The step and the brake shaft are molded in an integrative shape, and they provide the axial position for all the components fixed on the brake shaft by the socket and spigot joint.

Advantageously, on the outside of the internal screw thread pressure plate and the connection piece, there is a pair of convex lugs. The $\alpha$ angle is staged mutually during the installation between lug on the internal screw thread pressure plate and the lug on the connection piece. An inner side of the brake shaft coupling is equipped with the boss corresponding to a convex lug. This structure allows the boss of brake shaft coupling to make contact with only one lug on the internal screw thread pressure plate, or on the connection piece under the outside force, and thus, plays the role of a state exchange device.

Advantageously, on the front end of the brake shaft, there are external splines. The external splines mesh with the internal splines on the inner side of the connection piece. By the meshing between the external splines and the internal splines on the inner side of the connection piece, it is possible to adjust the initial position of the convex lug on the connection piece. When the power supply drives the rotating of the brake shaft coupling, the brake shaft coupling drives the internal screw thread pressure plate rotating certain angle, firstly by the connection of the boss on the inner side of the brake shaft coupling and the convex lug on the internal screw thread pressure plate. The brake shaft coupling does not make contact with the convex lug on the connection piece, and thus the connection piece does not take the force to the external friction piece and inner friction piece. A gap exists between the external friction piece and inner friction piece. When the brake shaft coupling continues rotating, the boss on the brake shaft coupling drives the convex lug on the connection piece. At this moment, the connection piece drives the brake shaft rotating through the internal spline on the inner side of the connection piece. On the contrary, when the brake shaft coupling rotates to another direction, it firstly connects to the convex lug on the connection piece.

Advantageously, a disk type spring is provided between said fixing apparatus and the first inner friction piece. Two spring pieces make up into the disk spring, which can achieve a high load power in the narrow and small space.

Advantageously, on the brake shaft, there is a combination of three groups of inner friction pieces and external friction pieces. In the ordinary status, the combination of the three groups of inner friction pieces and external friction pieces can meet the requirement of capstan winch braking for civil use. The specific number of sets is based on the demand of transmission torque of the brake.

Advantageously, a spring shield ring is provided for the hole fixed on a position of corresponding to the shaft frame on the reel. The spring shield ring for the hole determines the axial position actions, such as the brake subassembly, and makes the system become a whole one, and reduces the friction effect on the shaft frame.

Advantageously, a spring shield ring is fixed on the brake shaft between the connection piece and the brake shaft coupling by means of the socket and spigot joint. The spring shield ring can effectively reduce the friction between the connection piece and the brake shaft coupling, and, also, it can guarantee the mesh connection of the spline between the connection piece and the brake shaft coupling does not break out.

Advantageously, a plain washer is provided between said disk type spring and the fixing apparatus. The plain washer is used to position the disk type spring, and to reduce the friction between the disk type spring and the fixing apparatus.

Advantageously, the inner friction piece and external friction piece are the steel castings. The steel casting is wear-resisting, heat transmission is fast, and it is applicable for a friction braking mechanism.

With the one-way load self-control spiral type brake of the present invention, the power supply drives the brake shaft coupling rotating according to a direction, and the brake shaft coupling firstly drives the rotation of the internal screw thread pressure plate. A torsional spring is provided between the internal screw thread pressure plate and the connection piece, which causes the internal screw thread pressure plate to lean on the outside friction piece all the while. Under the action of the screw mechanism, there is a gap in the axial direction between the internal screw thread pressure plate, the outer friction piece, and the inner friction piece. The brake shaft coupling then drives (rotates) the connection piece and the brake shaft, and the power supply drives the brake shaft coupling rotating according to another direction. The brake shaft coupling firstly drives the rotation of the connection piece and the brake shaft. Under the action of the screw mechanism, there a gap in the axial direction is provided between the internal screw thread pressure plate, the outer friction piece and the inner friction piece. Further, the brake shaft coupling drives the rotation of the connection piece and the brake shaft. When the power supply stops again after it begins to rotate, under the torque force of the torsional spring, the internal screw thread pressure plate leans on the outside friction piece and makes the internal screw thread pressure plate, the outer friction piece and the inner friction piece tightly pressed together. Further, at that time the position of the external tooth set on the outer circle, of said external friction piece is pressed to the corresponding position of the inner tooth in the inner side of the reel. The external friction piece meshes with the reel together by means of the external tooth and the inner tooth, and they are fixed in the circumferential direction. Therefore, under the effect of a load like the reel, the reel and the brake shaft fasten together as a whole, and play the role of braking.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
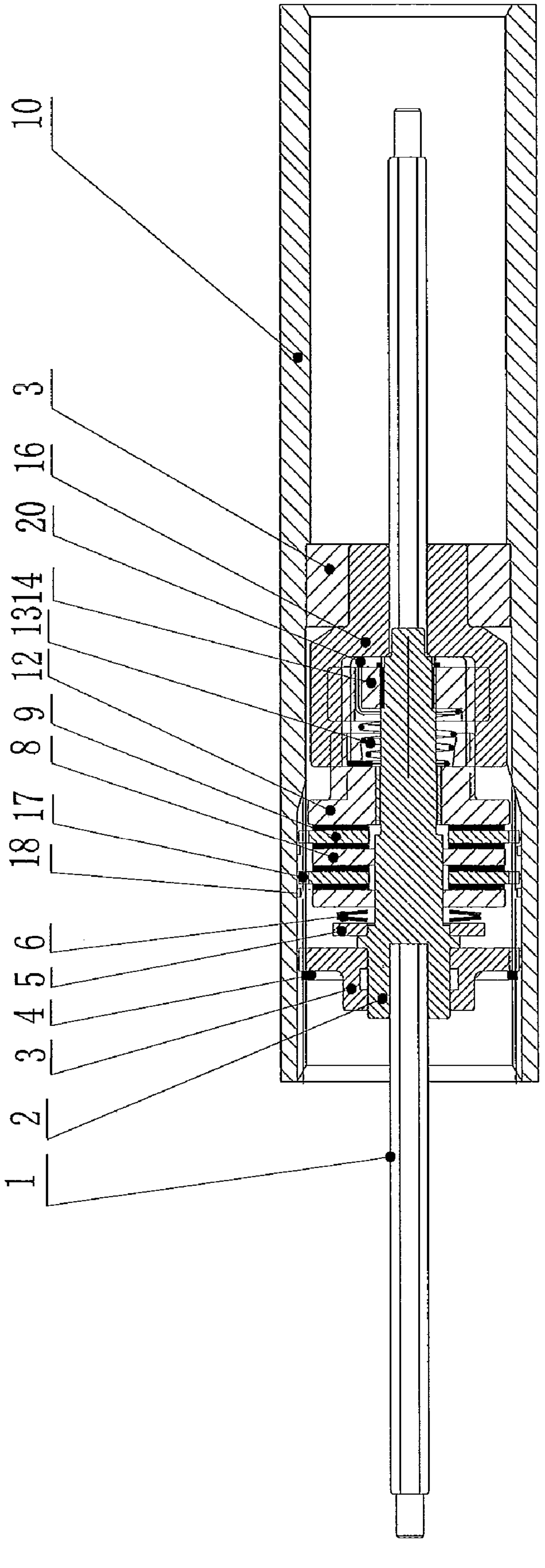
FIG. 1 is the internal structure schematic diagram of the one-way load self-control spiral type brake in the present invention.
Figure 2:
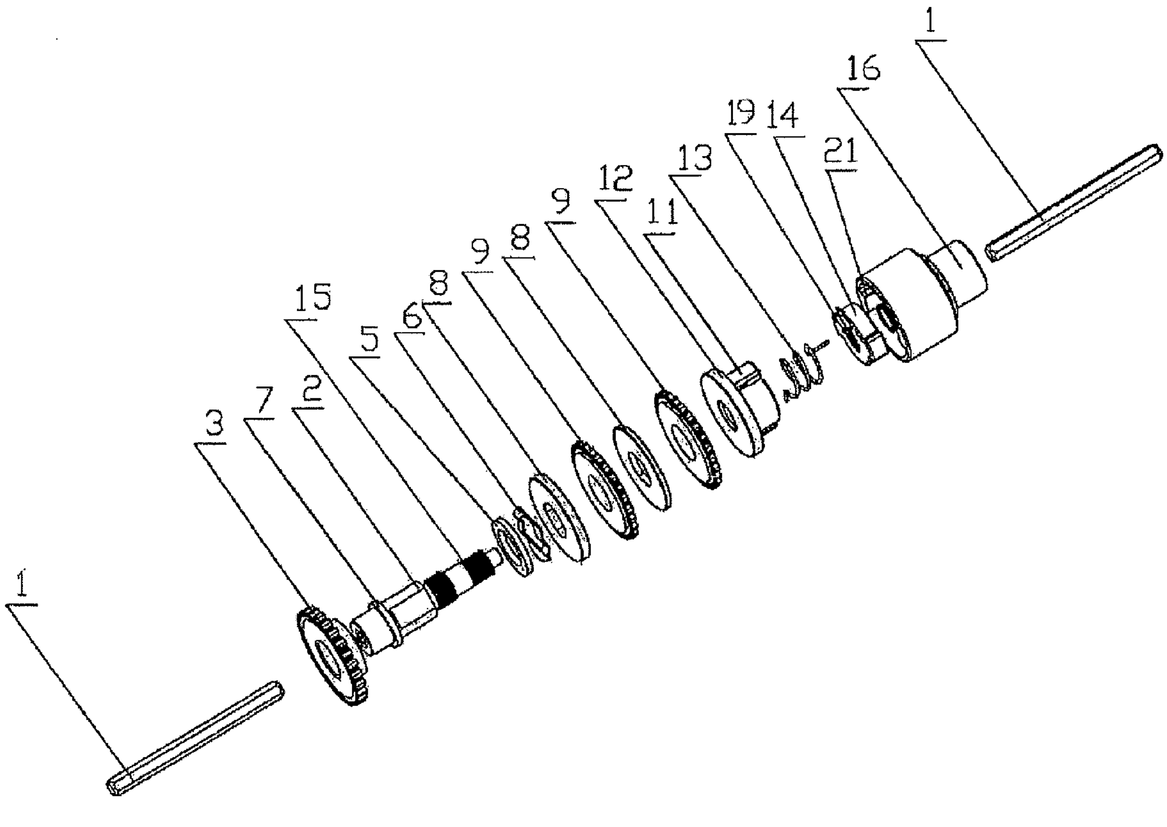
FIG. 2 is the brake shaft schematic diagram of the one-way load self-control spiral type brake in the present invention.
Figure 3:
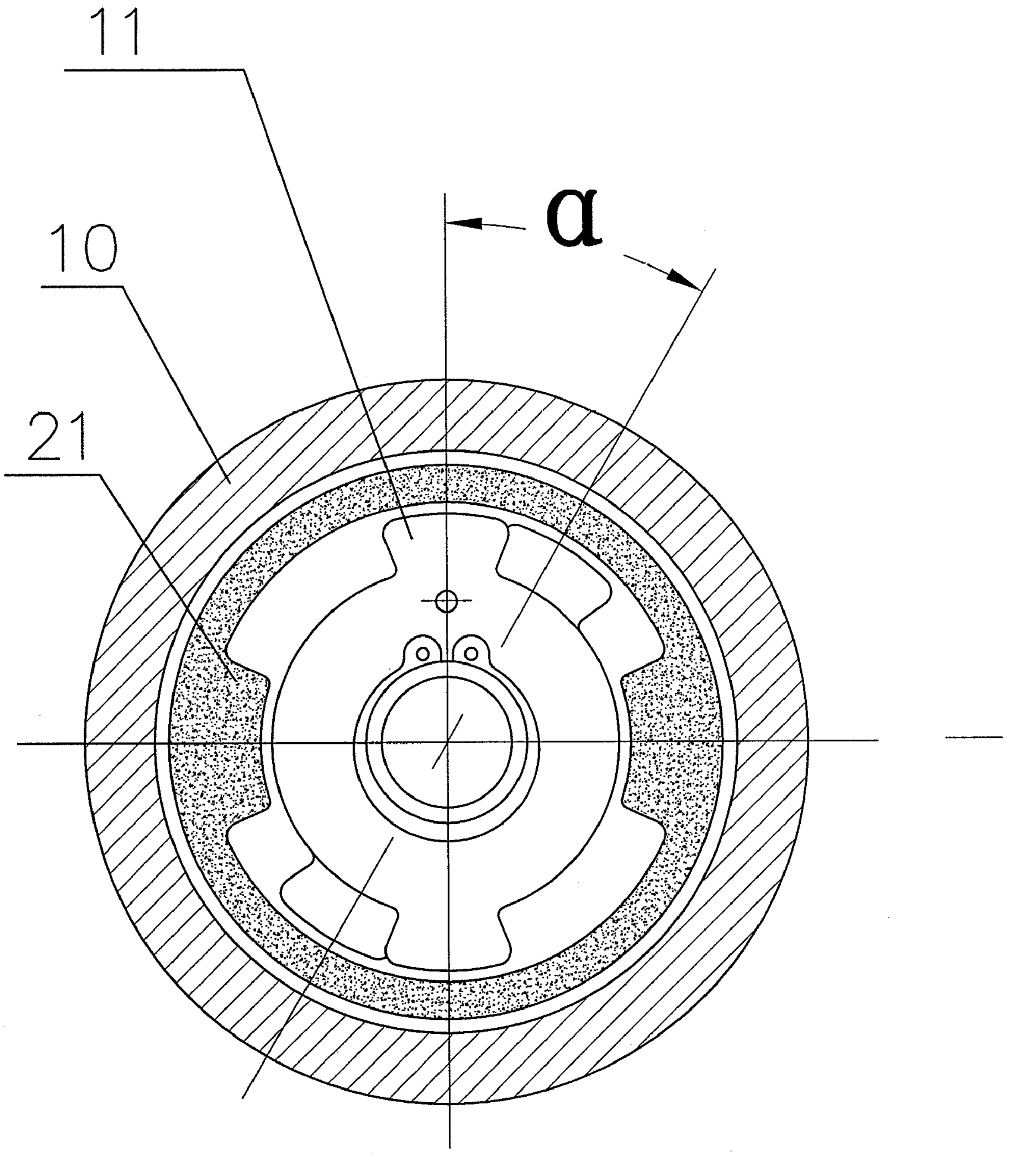
FIG. 3 is the section schematic diagram of the one-way load self-control spiral type brake in the present invention.

As can be seen from FIG. 1, FIG. 2, and FIG. 3, the present invention provides a one-way load self-control spiral type brake. The brake includes the reel 10. Two bearing frames 3 are equipped in the reel 10. The brake shaft 2 is set between the two bearing frames 3. The two ends of the brake shaft 2 connect the transmission shaft 1. The front end of said brake shaft 2 is equipped with the fixing apparatus 7, and from the fixing apparatus 7, there is, in turn, fixed the following units around the brake shaft 2. The inner friction piece 8 and the external friction piece 9 are alternately fixed by means of a socket and spigot joint, and, in turn, the internal screw thread pressure plate 12, the torsional spring 13, the connection piece 14 and the brake shaft coupling 16 are fixed by means of the socket and spigot joint. The inner friction piece 9 and the brake shaft 2 mesh with each other, and the external tooth 17 set on the outer circle of said external friction piece 9. The front end of said brake shaft coupling 16 is fixed on the outside of the internal screw thread pressure plate 12, the torsional spring 13 and the connection piece 14 by means of the socket and spigot joint. In the reel 10, there is an inner tooth 18 which meshes the external tooth 17 on the outer circle of said external friction piece 9. The fixing apparatus 7 and the brake shaft 2 are formed by an integrative molding step. On the outside of the internal screw thread pressure plate 12 and the connection piece 14, a pair of convex lugs 11 is provided. The α angle is staged mutually during the installation between lug on the internal screw thread pressure plate 12 and the convex lug 11 on the connection piece 14. The inner side of the brake shaft coupling 16 is equipped with the boss 21 corresponding to the convex lug 11. External splines 15 are provided on the front end of the brake shaft 2. The external splines 15 mesh with the internal splines 19 on the inner side of the connection piece 14. There is a disk type spring 6 between said fixing apparatus 7 and the first inner friction piece 8. Two spring pieces make up the disk spring 6. There is a combination of three groups of inner friction pieces 8 and external friction piece 9 on the brake shaft 2. A spring shield ring 4 is used for the hole fixed on the position of corresponding to the shaft frame 3 on said reel 10. A spring shield ring 20 fixed on the brake shaft 2 between the connection piece 14 and the brake shaft coupling 16 by means of the socket and spigot joint. A plain washer 5 is provided between said disk type spring 6 and the fixing apparatus 7. The inner friction piece 8 and external friction piece 9 are steel castings.

When installing the brake, as long as most of the components are fixed on the brake shaft 2 by means of the socket and spigot joint, the installation is very convenient. However, under the mesh force between the external splines 15 on the front end of the brake shaft 2 and the internal splines 19 on the inner side of the connection piece 14, the α angle is staged mutually from the beginning during the installation between the two convex lugs 11 on the internal screw thread pressure plate 12 and on the connection piece 14.

There are several following states when executing the detailed embodiments.

When the motor rotates clockwise after it has been supplied with power, it firstly drives the transmission shaft 1 and the brake shaft coupling 16. Then, the two bosses 21 on the brake shaft coupling 16 drives the two convex lugs 11 on the internal screw thread pressure plate 12. This forces the screw mechanism formed by the brake shaft 2 and internal screw thread pressure plate 12 to start the action. Thus, the status of the internal screw thread pressure plate 12, the disk spring 6, the plain washer 5, the inner friction piece 8 and the external friction piece 9 loosens from the tight pressing with each other. At this moment torsional spring 13 is in the state of increasing torsion. After the internal screw thread pressure plate 12 turns over by angle α, the two bosses 21 on the brake shaft coupling 16 then drive the two convex lugs 11 on the internal screw thread pressure plate 12 and on connection piece 14 rotating together. At this moment the screw mechanism is inoperative, so the brake shaft coupling 16 rotates together with the brake shaft 2 by the connection piece 14.

2. When the motor rotates counter clockwise after power has been supplied, it firstly drives the transmission shaft 1 and the brake shaft coupling 16. Then, the two bosses 21 on the brake shaft coupling 16 drive the two convex lugs 11 on the connection piece 14. It forces the screw mechanism formed by the brake shaft 2 and internal screw thread pressure plate 12 to start the action. Thus, the status of the internal screw thread pressure plate 12, the disk spring 6, the plain washer 5, the inner friction piece 8 and the external friction piece 9 loosens from being tightly pressed against each other. At this moment torsional spring 13 is in the state of increasing torsion. After the connection piece 14 turns over by angle α, the two bosses 21 on the brake shaft coupling 16 then drive the two convex lugs 11 on the internal screw thread pressure plate 12 and on connection piece 14 rotating together. At this moment the screw mechanism is inoperative, so the brake shaft coupling 16 rotates together with the brake shaft 2 by the connection piece 14.

3. When power is not supplied to the motor, and the reel is not under any load forces, the torsional spring 13 stores torque forces in the condition that the motor has the power supply, and it is in a state of tight torsion. At this moment, under the torque force of the torsional spring 13, the internal screw thread pressure plate 12 rotates, and thus the internal screw thread pressure plate 12, the disk spring 6, the plain washer 5, the inner friction piece 8 and the external friction piece 9 tightly pre-press with each other. This state is the precondition provided for the brake apparatus taking an action effect when the reel 10 drives the load and power is not supplied to the motor.

4. When power is not supplied to the motor, and the reel is under the load forces, the speed reducer device transmits the torque towards the direction of speed acceleration. That is, the torque is transmitted from the reel 10 all along to the transmission shaft 1, then the transmission shaft 1 drives the brake shaft 2 and the internal screw thread pressure plate 12. At this time, the internal screw thread pressure plate 12 is tightly stuck to the external friction piece 9, and thus the screw mechanism on the brake shaft 2 has the effect of action. That is, under the force of the load, the internal screw thread pressure plate 12 presses the disk spring 6, the plain washer 5, the inner friction piece 8 and the external friction piece 9 increasingly tighter, and the external friction piece 9 and the reel 10 mesh together by means of the external tooth 17 on the outer circle of said external friction piece 9 and the inner tooth 18 on the reel 10. In this case the brake device has the effect of braking.

5. Based on the above forth state, if the motor is driven to rotate counter clockwise, that is the loosened direction of the steel rope on the reel 10, and if the load force causes the rotate speed of the brake shaft 2 exceeding the rotate speed of the motor, the braking system will produce great vibrations. That is, the braking system will produce the alternative process of releasing braking-braking-releasing braking-braking. Therefore, adding the disk spring 6, the speed of the brake shaft 2 will not exceed the speed of the motor by the load force when each friction piece is not totally loosened at the moment of the motor staring-up. Therefore, vibrations produced by the braking system are avoided.

Furthermore, in the process of braking, the external friction piece 9 and the reel 10 connect to each other, and they are steel castings. Therefore, heat produced during the braking process can be sent out quickly. Heat dissipation is good.

The present invention provides a one-way load self-control spiral type brake and a new braking mode. It overcomes the shortcomings of limited heat dissipation capabilities of conventional awl drum type, piston ring type, and ratchet type braking systems. This invention is especially useful for the capstan winch braking.

What is claimed is:

1. A one-way load self-control spiral type brake, comprising:
- a reel (10),
- two bearing frames (3) equipped in the reel (10),
- a brake shaft (2) set between the two bearing frames (3), two ends of the brake shaft (2) connecting a transmission shaft (1), a front end of said brake shaft (2) being equipped with a fixing apparatus (7),
- wherein, behind the fixing apparatus (7), a first inner friction piece (8), a first external friction piece (9), a second inner friction piece (8), a second external friction piece (9), an internal screw thread pressure plate (12), a tension spring (13), a connection piece (14) and a brake shaft coupling (16) are provided in sequential order around the brake shaft (2), and are fixed together by a socket and spigot joint,
- wherein the inner friction piece (9) and the brake shaft (2) mesh with each other, and
- an external tooth (17) is set on an outer circle of the external friction piece (9),
- a front end of the brake shaft coupling (16) is fixed on an outside of an internal screw thread pressure plate (12), and
- in the reel (10), an inner tooth (18) meshes with an external tooth (17) on an outer circle of the external friction piece (9).

2. A one-way load self-control spiral type brake as defined in claim 1, wherein said fixing apparatus (7) and said brake shaft (2) form an integrative molding step.

3. A one-way load self-control spiral type brake as defined in claim 1, further comprising a pair of convex lugs (11) provided on the outside of the internal screw thread pressure plate (12) and the connection piece (14),
- wherein an α angle is staged mutually during installation between the lugs (11) on the internal screw thread pressure plate (12) and the convex lugs (11) on the connection piece (14), and an inner side of the brake shaft coupling (16) is equipped with a pair of bosses (21) corresponding to the convex lugs (11).

4. A one-way load self-control spiral type brake as defined in claim 3, further comprising external splines (15) provided on the front end of the brake shaft (2),
- wherein the external splines (15) mesh with the internal splines (19) on the inner side of the connection piece (14).

5. A one-way load self-control spiral type brake as defined in claim 1, further comprising a disk type spring (6) provided between said fixing apparatus (7) and the first inner friction piece (8), the disk spring (6) having two spring pieces.

6. A one-way load self-control spiral type brake as defined claim 1, further comprising a third inner friction pieces (8) and a third external friction piece (9) on the brake shaft (2).

7. A one-way load self-control spiral type brake as defined in claim 1, further comprising a spring shield ring (4) positioned so as to fix the shaft frame (3) on the reel (10).

8. A one-way load self-control spiral type brake as defined in claim 1, further comprising a spring shield ring (20) positioned between the connection piece (14) and the brake shaft coupling (16).

9. A one-way load self-control spiral type brake as defined in claim 1, further comprising a plain washer (5) positioned between a disk type spring (6) and the fixing apparatus (7).

10. A one-way load self-control spiral type brake as defined in claim 1, wherein the inner friction pieces (8) and the external friction pieces (9) are formed of steel castings.

* * * * *